BACKWARD ACTING COMPANDOR IN A DIGITAL TRANSMISSION SYSTEM

Filed April 3, 1968 2 Sheets-Sheet 1

INVENTORS S. J. BROLIN
J. M. BROWN
BY R. B. Ardis
ATTORNEY

Feb. 16, 1971 S. J. BROLIN ET AL 3,564,415

BACKWARD ACTING COMPANDOR IN A DIGITAL TRANSMISSION SYSTEM

Filed April 3, 1968 2 Sheets-Sheet 2

United States Patent Office 3,564,415

Patented Feb. 16, 1971

3,564,415

BACKWARD ACTING COMPANDOR IN A DIGITAL TRANSMISSION SYSTEM

Stephen J. Brolin, Bronx, N.Y., and James M. Brown, Holmdel, N.J., assignors to Bell Telephone Laboratories, Incorporated, Murray Hill, N.J.

Filed Apr. 3, 1968, Ser. No. 718,550
Int. Cl. H03k *13/22*
U.S. Cl. 325—38 16 Claims

ABSTRACT OF THE DISCLOSURE

A digital transmission system is disclosed utilizing backward acting companding. A variable size step pulse source is used at the modulator to achieve compression and another is used at the demodulator to achieve complementary expansion. Means located at the demodulator responsive to a parameter of the transmitted message waveform are used to determine the amplitude of the variable size step pulse produced at the remotely located modulator and at the demodulator.

BACKGROUND OF THE INVENTION

This invention relates generally to a digital transmission system with companding which serves a number of remote stations from a central station on a time division basis and, more particularly, to a delta modulation transmission system employing companding.

A digital transmission system may be employed between a central station and a number of remote stations served by the central station. Each of the remote stations may, in turn, serve a number of utilization devices. By using time division multiplexing techniques, the remote stations may be served by the central station with a number of different transmission channels. For instance, there may be sixteen remote stations serving a total of eighty utilization devices. Probability considerations dictate that only fourteen transmission channels are needed to serve the eighty utilization devices. By providing these transmission channels on a time division basis, the eighty utilization devices may be fully served by allowing each channel to be assigned to any remote station and, further, to any utilization device.

Since each utilization device is directly connected to its associated remote station, a transmitter and receiver are located in each remote station corresponding to the subscriber served by it. Therefore, if a remote station serves five subscribers, it would include five transmitters and five receivers.

In digital transmission systems employing quantizing techniques for transmission, companding may be employed to minimize quantizing noise. Generally, companding entails sensing at least one parameter and using the sensed parameter to vary the quantizing step size used for the modulator in the transmitter. At the modulator, the message signal is compressed by using the variable size step pulse, while at the demodulator, the companding information is used to provide complementary expansion. In this manner, companding is accomplished by adapting the size of the quantizing step signal used for both compression and expansion to a parameter of the message signal.

One type of differential pulse code modulation employed for digital transmission is known as delta modulation. In order to minimize quantizing noise and overload distortion common to delta modulation transmission systems, an appropriate form of companding may be introduced into the delta modulation system. In this manner, the dynamic range of the message waveform is, in effect, reduced by compression at the transmitter and restored by complementary expansion at the receiver. With its dynamic range reduced, the message waveform is less subject to either quantizing noise or overload distortion. Patent application Ser. No. 572,823, filed Aug. 16, 1966 by S. J. Brolin, which issued as U.S. patent 3,461,244 on Aug. 12, 1969, sets forth a delta modulation transmission system with one type of companding known as continuous companding. At the transmitter (located either at the central or remote stations), a level sensor is utilized to compress the dynamic range of the message waveform. The level sensor senses two parameters (amplitude and frequency) of the message signal. Under control of the sensed parameters, companding digits are derived which control the size of the step pulse for the delta modulator. The step pulse size may assume any value within a prescribed range. The companding digits are transmitted to the delta demodulator where, under their control, complementary expansion of the message signal is accomplished. This type of companding is known as forward acting continuous companding requiring the level sensor to be at the transmitter.

Patent application Serial No. 674,943, filed Oct. 12, 1967 by S. J. Brolin, which issued as U.S. patent 3,500,441 on Mar. 10, 1970, sets forth a delta modulation system with another type of forward acting companding. In that application, the size of the step pulse used for compression and expansion may take on any of several discrete logarithmically related values. A level sensor, located at the transmitter, is used to determine which discrete size step will be utilized. As with the continuous companding scheme, companding digits are sent to the delta demodulator where, under their control, complementary expansion is accomplished. This discrete companding scheme is also forward acting since the companding information is determined at the transmitter and transmitted along with the message signal to the receiver. Therefore, forward acting companding requires a parameter sensing means which determines the companding information to be located at the transmitter.

Where a digital transmission system is to be employed between a central station and a plurality of remote stations, a forward acting companding scheme used to minimize quantizing noise would require parameter sensing means for each remotely located transmitter in order to minimize quantizing noise between the remote transmitter and central receiver. For example, with delta modulation, both the continuous and discrete forward acting companding systems would require eighty level sensors located at the remote stations for the eighty transmitters. Since, at most, only fourteen of the utilization devices may be active at any one time in accordance with the number of transmission channels available, sixty-six of the level sensors would be inactive. By providing a level sensor to each channel for transmission from the remote to the central terminal rather than to each remote transmitter, significant equipment savings may be realized. In addition, if the level sensors are located at the central office, environmental control and maintenance will be improved. These advantages can be realized in other digital transmission systems since forward acting companding schemes to minimize quantizing noise used for digital transmission systems between a plurality of remote stations and a central station require a parameter sensing means for determining companding informaton located at each remote transmitter.

An object of the present invention is to provide a parameter sensing means for determining companding information per transmission channel for a time division digital transmission system for transmission of a message signal from a remote station to a central station.

Another object of the present invention is to locate the parameter sensing means for determining companding information used in a time division digital transmission system at an easily accessible location.

Still another object of the present invention is to remotely locate the parameter sensing means for determining companding information from the digital modulator.

SUMMARY OF THE INVENTION

The above objects are achieved in a delta modulation scheme by sensing the level of the message signal transmitted to the receiver, deriving companding digits from the sensed level at the receiver, and transmitting the derived companding digits to the modulator located at he transmitter to compress the transmitted signal in the delta modulator. Since the overall net loss in transmission is closely controlled, the message signal at the receiver output which is used to determine the companding digits will approximately equal that at the transmitter input. Therefore, a level sensor located at the receiver output will accurately sense the level of the message signal transmitted in order to determine the companding digits to be used for compression at the delta modulator and complementary expansion at the delta demodulator.

In accordance with another aspect of the present invention, the level sensors remotely located from the delta modulators in the remote terminals are located at the central terminal and assigned to active transmission channels. Since there may be only fourteen transmission channels, fourteen level sensors will be required to fully service all the utilization devices.

DETAILED DESCRIPTION

This invention pertains to time division signal transmission schemes utilizing companding. Prior schemes utilized forward acting companding which requires a large percentage of the parameter sensing means which determine companding information to be inactive. The present invention is a backward acting compandor which provides significant equipment savings for a time division digital transmission system. For illustrative purposes, a backward acting compandor is shown with one type of digital transmission system, a delta modulation transmission system.

Figure 1:
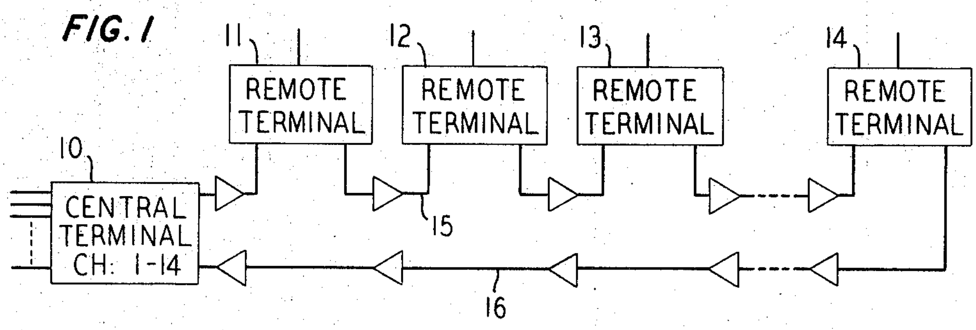
FIG. 1 is a block diagram of a complete multi-channel subscriber carrier system embodying the various features of the invention.

The subscriber carrier system illustrated in block diagram form in FIG. 1 include an office terminal, a plurality of remote terminals including terminals 11 through 14, an outward repeatered line 15 and an inward repeatered line 16. Office terminal 10 may be located at a telephone central office and contains delta modulation transmitting and receiving terminal equipment for fourteen telephone message channels. With the aid of concentration, these fourteen channels can provide private line telephone service for as many as eighty subscribers. The fourteen message channels are comibned in time division multiplex to service the remote terminals and, in turn, the telephone subscribers. The remote terminals are, in turn, spaced at intervals along outward repeatered line 15 and each contains delta modulation transmitting and receiving terminal equipment for one or more telephone message channels. At each remote terminal delta modulation receiving equipment intercepts the channel or channels with which it is at the moment associated and delta modulation transmitting equipment reinserts it on outward line 15. All fourteen message channels return to office terminal 10 in time division multiplex on inward line 16.

Each remote terminal may serve a single message channel or, alternatively and even more likely, different numbers of channels. With concentration, each remote terminal always serves the same subsribers but is not always associated with the same time division channels. Rather, different channels may be associated with different terminals under different conditions of operation. At office terminal 10 in FIG. 1 and at each remote terminal, suitable hybrid networks separate the two opposite directions of transmission in the respective message channels. For each channel a delta modulator converts the incoming waveform into binary digits for transmission out over the line and a delta demodulator converts received binary digits back into the original message waveform.

Time division multiplex is associated with the remote terminals while permanent line connections are maintained between the remote terminals and their associated subscribers. Consequently, the remote terminals contain the same number of delta modulators and demodulators as subscribers served by the terminal. Where companding is utilized in a delta modulation transmission system, a level sensor must be located at the delta modulator. Patent 3,461,244 of S. J. Brolin, sets forth a continuous companding scheme which requires a level sensor at the remote terminal. A discrete companding scheme is set forth in patent 3,500,441 of S. J. Brolin. The latter application also discloses a level sensor located at the remote terminal associated with the delta modulator at the remote terminal. Since delta modulation with companding as set forth in these prior applications requires a level sensor with each delta modulator, a plurality of level sensors are required in the remote terminals. If, for instance, the remote terminals serve eighty subscribers, there will be eighty delta modulators and eighty level sensors located in the remote terminals. Since, with the aid of probability and concentration, it has been determined that fourteen transmission channels are required to fully service the eighty subscribers, the remaining sixty-six level sensors will be inactive. Therefore, it would be desirable to provide a level sensor to each active message channel for transmission from the remote to the central terminal rather than a level sensor for each remote delta modulator.

Figure 2:
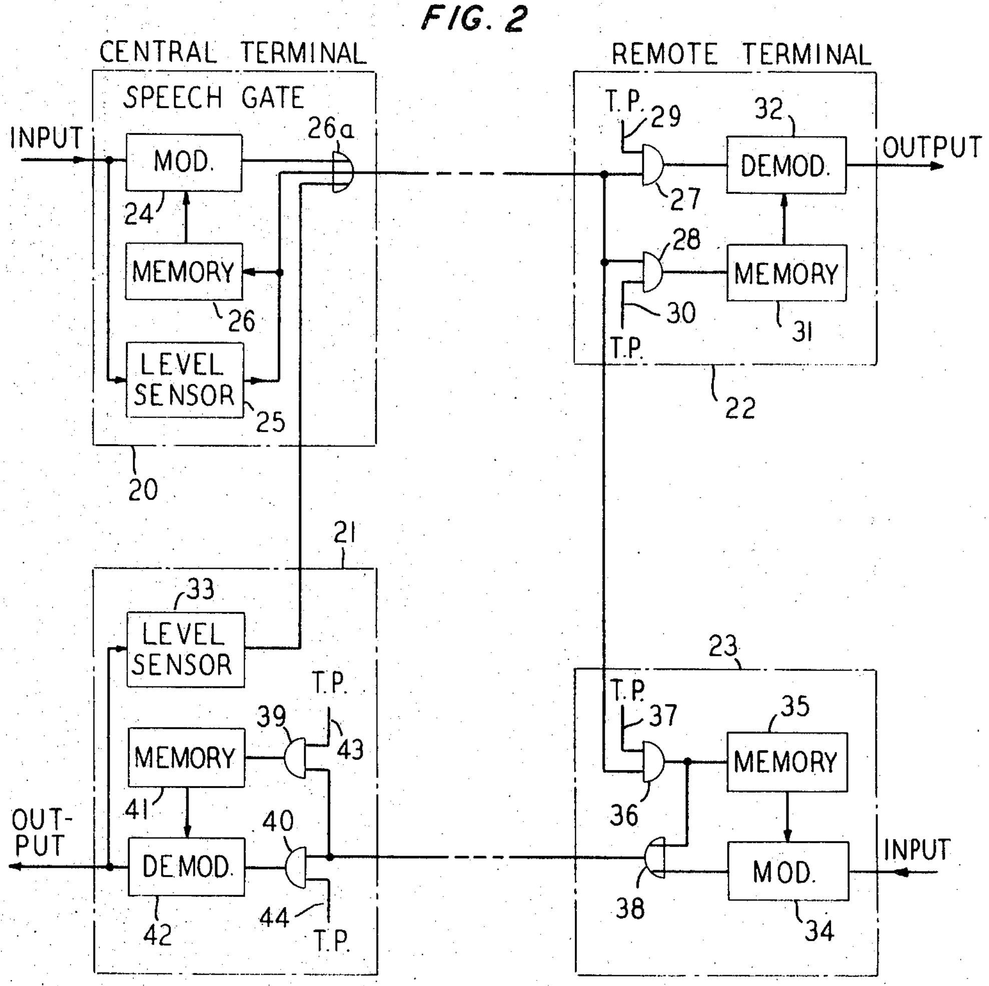
FIG. 2 is a more detailed block diagram of the transmitters and receivers located at the central and remote terminals.

FIG. 2 is a block diagram of a delta modulation transmission system with companding which, in accordance with the present invention, has a level sensor provided for each transmission channel for transmission from the remote to the central terminal rather than to each delta modulator. Transmitter 20 and receiver 21 are located at the control terminal, while receiver 22 and transmitter 23 are located at the remote terminal. Receiver 22 and transmitter 23 are associated with a subscriber. By utilizing time division multiplex, transmitter 20 and receiver 21 at the control terminal may be associated with any remote receiver and transmitter which is using an active transmission channel associated with transmitter 20 and receiver 21. For purposes of illustration, though, only one set of transmitting and receiving equipment located at the remote terminal is shown. An audio input is applied to transmitter 20 and is supplied to modulator 24. The input level is sensed in level sensor 25 which produces a digital representation of the level which is transmitted to receiver 22. The output of level sensor 25 is also applied to memory 26 which is used to cause the step pulse in modulator 24 to vary in accordance with the level of the input signal. Digital pulses representative of the step level and the speech are transmitted to receiver 22.

Digital information transmitted to receiver 22 is applied to AND gates 27 and 28 which are enabled in accordance with timing pulses applied to terminals 29 and 30. The step size information controls memory 31 which expands the message in demodulator 32. The output from demodulator 32 is then sent to a subscriber. The delta modulation transmission system comprising transmitter 20 and receiver 22 is an example of forward acting companding which has been set forth in the two prior patent applications referred to above.

Transmitter 23 is located at the remote terminal. It would be desirable to provide a level sensor for transmitter 23 on a channel basis rather than locating the level sensor at transmitter 23. To this end, level sensor 33 is part of receiver 21 located at the control terminal. The audio input from a subscriber is applied to modulator 34 located at remote transmitter 23. Delta modulation is performed therein, and a digital signal is transmitted to receiver 21 which is representative of the message signal. The digital information is demodulated in receiver 21 and applied to level sensor 33.

Since the overall net loss between transmitter 23 and receiver 21 is closely controlled, the level received at the output of receiver 21 may be made to approximately equal that applied at the input of modulator 34. Thus, level sensor 33 effectively senses the input level applied to modulator 34. The level sensor produces a digital signal which is transmitted through OR gate 26*a* back to memory 35 located at remote terminal 23. Memory 35 produces a variable size step pulse which is used in modulator 34. Thus, the variable size step pulse produced in memory 35 is controlled by the remotely located level sensor 33. The step produced in memory 35 is determined for some previous history of message signals but since the probability of rapid amplitude variation is slight, the amount of compression achieved in modulator 34 is suitable to the new sampled input signal at modulator 34.

Since closely complementary expansion must occur at the receiver, the level sensing bits are recirculated back to receiver 21 with the message signal that has been compressed in accordance with the sensed level. This enables the step size at receiver 21 to be changed at the same place in the message bit stream as in transmitter 23. If level sensor 33 were to expand the message waveform at receiver 21 differently from that compressed in the transmitter, significant transmission problems such as net loss fluctuations and distortion would ensue. Therefore, the amount of compression determined by level sensor 33 is recirculated back to receiver 21 with the message waveform that has been compressed, as determined by level sensor 33.

The digital information from level sensor 33 is applied to memory 35 through AND gate 36 with appropriate timing signals applied to terminal 37. The output of AND gate 36 is applied to memory 35 and to OR gate 38. The output from modulator 34 is also applied to OR gate 38 for transmission to receiver 21. Digital information transmitted from transmitter 23 is applied to AND gates 39 and 40 which are gated to memory 41 and demodulator 42, respectively, under control of timing pulses applied to terminals 43 and 44, respectively. Memory 41, under control of the sensed level information recirculated, produces a variable size step pulse which controls delta demodulator 42 in order to provide complementary expansion. The output of demodulator 42 is transmitted through the central office.

Other methods may be devised for achieving complementary expansion. For instance, rather than recirculating the companding information back to receiver 21, the companding information derived in receiver 21 may be stored in a buffer located there, and, by using synchronization signals to determine the proper location of the companding information in the data bit stream, complementary expansion may be accomplished in receiver 21.

A new type of companding utilizing transmitter 23 and receiver 21 has been set forth. For brevity's sake, it may accurately be described as backward acting companding. Since receiver 21 at the central terminal may be assigned to an active transmission channel rather than a fixed utilization device, level sensor 33 is also assigned to the same transmission channel. Thus level sensor 33 may be associated with any remote transmitter that is transmitting information in the channel assigned to level sensor 33. As a result of this backward acting companding, significant equipment savings may be realized. In addition, locating level sensor 33 at the central office provides for better accessibility for maintenance purposes and increased environmental control.

The principles of the backward acting compandor have been described with reference to a delta modulation transmission system. The delta modulation system is merely one type of digital transmission system. In a digital transmission system, the level sensor of the delta modulation system may be replaced by a generalized parameter sensing means for determining the companding information.

Figure 3:
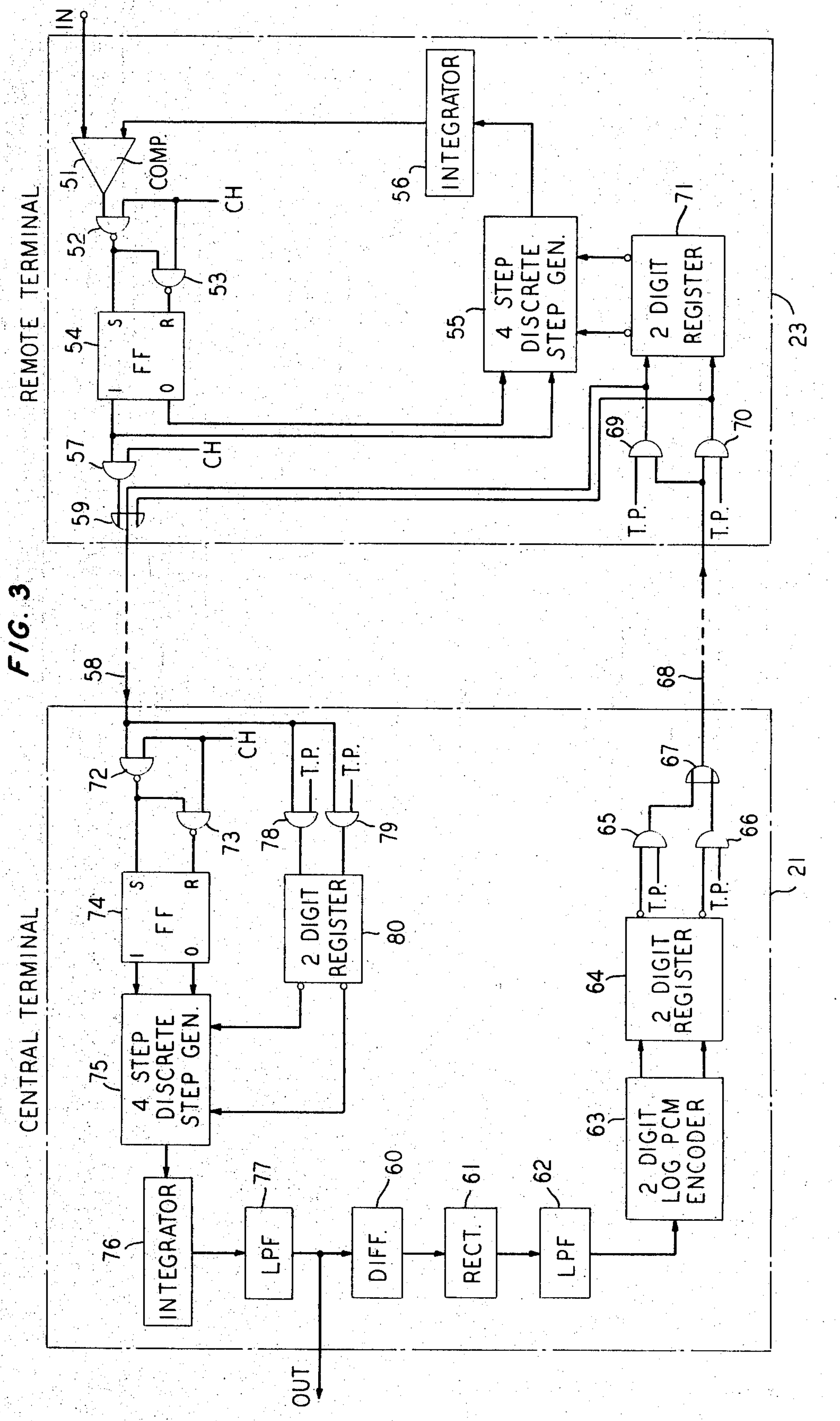
FIG. 3 is a block diagram of the transmitter located at the remote terminal and the receiver with the remotely located level sensor at the central office suitable for use in the subscribed carrier system illustrated in FIG. 1.

FIG. 3 is a more detailed representation of transmitter 23 and receiver 21 of FIG. 2. For purposes of illustration, the backward acting compandor in FIG. 3 is shown for discrete companding. In order to apply the backward acting companding technique to continuous companding, the teachings of the present invention may be applied to that disclosed in patent 3,461,244 of S. J. Brolin. The message waveform from a subscriber is applied to one input of comparator 51 which is a two-input circuit delivering an output having the polarity of the difference between its inputs. The output of comparator 51 is connected to a sample-and-hold circuit made up of a pair of inverting AND gates 52 and 53 and a bistable multivibrator or flip-flop 54. The inverting property of AND gates 52 and 53 is indicated symbolically by the small circles at their respective outputs. As illustrated in FIG. 3, the output of comparator 51 is connected to one input of AND gate 52 and the output of AND gate 52 is connected to one input of AND gate 53. Channel pulses are applied to the other inputs of AND gates 52 and 53. The output of AND gate 52 is connected to the set input of flip-flop 54, while the output of AND gate 53 is connected to the reset input R.

When the output of comparator 51 is positive while a channel pulse is present, AND gate 52 applies a negative voltage to the set input of flip-flop 54 and AND gate 53 applies a positive voltage to the reset input. Under such conditions, the output state of flip-flop 54 is as illustrated, with binary "1" appearing at the upper or set output and binary "0" appearing at the lower or reset output. When the output of comparator 51 is negative during a channel pulse, AND gate 52 applies a positive voltage to the set input of flip-flop 54 and AND gate 53 applies a negative voltage to the reset input. Under such conditions, the output state of flip-flop 54 is opposite to that illustrated, with binary "0" appearing at the upper or set output and binary "1" appearing at the lower or reset output. By way of example, in both states of flip-flop 54 binary "1" is represented by a positive voltage and binary "0" by a zero voltage.

The outputs of flip-flop 54 are connected to respective inputs of a four-step discrete step signal generator 55, which generates a positive-going step signal when flip-flop 54 is in the state illustrated and a negative-going step signal when flip-flop 54 is in the opposite state. The output of step signal generator 55 is connected to an integrating circuit 56, and the output of integrator 56 is connected to the remaining input of comparator 51. Integrator 56 may include one or more stages of integration, as desired.

Output digits are taken from the upper or set output of flip-flop 54 and applied to one input of AND gate 57, the other input of which is supplied with channel pulses, delayed slightly from those applied to AND gates 52 and 53. The output from AND gate 57 is supplied to the outgoing line 58 through an OR gate 59. Except for the four-step discrete step generator 55, the portion of the apparatus illustrated in FIG. 3 which has thus far been described, is a conventional delta modulator. The sample-and-hold circuit samples the output of comparator 51 at a rate sufficiently high to permit the audio message waveform to be reproduced with acceptable accuracy. If the output of comparator 51 is positive, indicating that the instantaneous amplitude of the message waveform is larger than the output of integrator 56, a positive step signal is provided by generator 55 and binary "1" is transmitted through AND gate 57 and OR gate 59. If the output of comparator 51 is negative, indicating that the instantaneous amplitude of the message waveform is smaller than the output of integrator 56, the step signal produced by generator 55 is negative and binary "0" is transmitted through AND gate 57 and OR gate 59.

As set forth in U.S. Pat. 3,500,441 of S. J. Brolin, the dynamic range of the delta modulator itself is enhanced by adapting the size of the positive-going and negative going step signals produced by generator 55 to the volume level and frequency content of the message waveform on a discrete basis. In that patent application, a level sensor is connected in transmitter 23 located at the remote terminal.

As shown in FIG. 2 above, the level sensor, in accordance with the present invention, has been located at the central station. It was recognized that the demodulator output at receiver 21 was approximately the same level as the input applied to comparator 51. Therefore, the output level at receiver 21 is applied to a level sensor located at the central station. Since a delta modulator overloads on slope, a level sensor made up of differentiator 60, rectifier 61 and low-pass filter 62 in tandem is connected from the output of receiver 21 to the input of a two-digit pulse code modulator encoder 63. Encoder 63 is a pulse code modulation encoder of a type well known in the art, producing a two-digit parallel binary code output on its two output leads.

As a two-digit encoder, encoder 63 encodes up to four different levels. These are preferably logarithmically related to one another, twelve decibels apart. The most significant digit of the binary code output of pulse code modulation encoder 63 appears on the upper of the two output leads and the least significant digit appears on the lower. The encoder is supplied with timing to control its operation.

The output from pulse code modulation encoder 63 is gated into a two-digit register 64 and stored there until the next cycle when it is read out. Two-digit register 64, as indicated by the small circles, has its outputs inverted. Each stored binary "0" is thus delivered as binary "1" and vice versa. On the output side of register 64 the most significant digit from encoder 63 appears on the upper lead and is supplied to one input of AND gate 65, while the least significant digit appears on the lower lead and is supplied to one input of AND gate 66. The other inputs of AND gates 65 and 66 are supplied with specified timing pulses. The outputs of AND gates 65 and 66 form the inputs for OR gate 67, the output of which is transmitted from the central to the remote station by way of transmission line 68. To control the operation of step signal generator 55, the outputs of AND gates 65 and 66 are transmitted through OR gate 67 and transmission line 68 to a pair of AND gates 69 and 70 located at the remote station. AND gates 69 and 70 each have two inputs, one of which is supplied by the output of OR gate 67, while the other receives timing pulses. The timing pulse applied to AND gate 69 is delayed from the timing pulse applied to AND gate 65 by the one-way transmission delay from receiver 21 to transmitter 23. This enables the companding digits to be utilized at the proper time in the data bit stream. Similarly, the timing pulse applied to AND gate 70 is delayed from the timing pulse applied to AND gate 66 by the same one-way transmission delay. The outputs from AND gates 69 and 70 are supplied to a two-digit register 71 located at the remote terminal.

Register 71 is much the same as register 64. The output leads from register 71 supply the digits carried by them directly as control signals to step generator 55 which produces one of four each discrete step signal levels. These levels, which are controlled by the two-digit binary code group originally generated by pulse code modulation encoder 63, are preferably logarithmically related to one another, twelve decibels apart, and may be either positive-going or negative-going, depending upon the state of flip-flop 54. The step signal used in the delta modulation process is thus made to increase in magnitude by discrete steps as the slope of the message waveform increases and to decrease in magnitude by discrete steps as the slope decreases.

The two-digit encoded signal which controls step generator 55 to achieve compression in transmitter 23 is recirculated through OR gate 59 and transmission line 58 to reeciver 21. The two-digit pulse code is transmitted with the message waveform which has been compressed in accordance with the two-digit code. Since the two-digit code has been derived from a previous history of speech samples, it may not achieve the optimum compression at transmitter 23. But the message signal will be expanded in receiver 21 in the same manner in which it was compressed in transmitter 23 since the two-digit code will be transmitted along with the compressed message signal. It would be possible to utilize the derived two-digit code at the receiver to immediately expand the message signal received by receiver 21 but the compression and expansion must be complementary. Therefore, the same two-step code that is used to compress, must also be used to expand. Otherwise, significant transmission problems will ensue.

Receiver 21, in essence, is a delta demodulator serving not only to decode the received message digits and convert them back to the original message waveform, but also to provide discrete slylabic expansion which is complementary to the compression performed at the transmitting terminal in the associated delta modulator. As shown, transmission line 58 is connected to a sample-and-hold circuit made up of a pair of inverting AND gates 72 and 73 and a flip-flop 74. Transmission line 58 is connected to one input of AND gate 72 and the output of AND gate 72 is connected to one input of AND gate 73. The remaining inputs of AND gates 72 and 73 are supplied with channel pulses. The output of AND gate 72 is also connected to the set input S of flip-flop 74 and the output of AND gate 73 is connected to the reset input R.

The set and reset outputs of flip-flop 74 are connected to respective inputs of a four-step discrete step signal generator 75, which is substantially identical to step signal generator 55 located at transmitter 23. Step signal generator 75 produces a positive-going step signal when flip-flop 74 is in the state illustrated, and a negative-going signal when flip-flop 74 is in the opposite state. The output of step signal generator 75 is connected through an integrator 76 to a low-pass filter 77 to recreate the originally encoded message waveform. Integrator 76 is substantially identical to integrator 56 located in transmitter 23 and, like it, may include one or more stages of integration, as desired.

In operation, the incoming binary message digits carried by transmission line 58 cause the sample-and-hold circuit, step signal generator 75, and integrator 76 to track the action of the sample-and-hold circuit, step signal generator 55, and integrator 56 in transmitter 23. A received binary "1" causes a negative voltage to appear at the output of AND gate 72 and a positive voltage to appear at the output of AND gate 73. Flip-flop 74 is switched to the state illustrated and step signal generator 75 produces a positive-going signal. A received binary "0" causes a positive voltage to apepar at the output of AND gate 72. Flip-flop 74 is switched to the state opposite that illustrated, and step signal generator 75 produces a negative-going step signal. Receiver 21 is provided with a discrete syllabic expansion complementary to the discrete syllabic compression provided by the audio delta modulator in transmitter 23. This syllabic expansion is provided by a pair of AND gates 78 and 79 and two-digit register 80. The digital information carried by transmission line 58 is supplied to one input each of AND gates 78 and 79, which serve to select the incoming companding digits with the aid of timing pulses which are delayed from the timing pulses applied to AND gates 65 and 66 by the total round trip transmission delay, respectively. Register 80 is substantially the same as register 71 in transmitter 23 and, like it, inverts the digits appearing on its two output leads. These inverted companding digits are applied as control signals to step signal generator 75, causing the latter to track the operation of step signal generator 55.

FIG. 3 illustrates a backward-acting compandor for one type of digital transmission system, a delta modulation system. In the backward-acting compandor of the delta modulation system, the variable size step in the delta modulator is controlled by a level sensor located in the delta demodulator. By locating the level sensor in the delta demodulator located at the control terminal, substantial equipment savings are realized since, in accordance with the present invention, a level sensor is assigned to each channel of transmission for transmission from the remote to the central terminal rather than to each subscriber, as is found in the prior art.

FIG. 3 has set forth a detailed description of a backward acting syllabic compandor. Patent 3,461,244 of S. J. Brolin sets forth a continuous forward acting companding scheme which may also be adapted by one skilled in the art to the principles of the present invention.

As stated above, the principles of the present invention may be utilized in any digital transmission system. The backward acting compandor has been illustrated with a delta modulation system, but the principles of the present invention may be used in any digital transmission system utilizing companding. The term "companding" applied to any digital system where the message signal to be transmitted is compressed before transmission and complementary expanded at the receiver.

It is to be understood that the above-described arrangement is illustrative of the application of the principles of the invention. Numerous other embodiments may be devised without departing from the spirit and scope of the invention.

What is claimed is:

1. A digital system with companding for transmission of message signals between first and second terminals, said first terminal comprising a modulator for producing a digital message signal, said modulator including first means for producing variable size quantizing step pulses for use in producing the digital message signal, and means for controlling the magnitude of the step pulses produced by said first means comprising second means at said second terminal responsive to the transmitted message signal for generating control signals and transmitting them back to said first terminal, and means at the first terminal for applying the control signals to said first means.

2. Apparatus as set forth in claim 1 further comprising:

a demodulator at said second terminal including second means to produce a variable size step signal for said demodulator where the magnitude of the step produced by said second variable size step means is controlled by said means at said second terminal which controls the magnitude of the step produced by said first variable size step means.

3. Apparatus as set forth in claim 2 wherein said means at said second terminal which controls the magnitudes of the steps produced at said first and second terminals comprises:

means to sense a parameter of the message signal, an $n$ digit pulse code encoder connected to encode the sensed parameter in terms of $n$ binary digits, and means to transmit said $n$ binary digits to said first terminal to control the magnitude of the step produced by said first variable size step means.

4. Apparatus as set forth in claim 3 including further means to transmit said $n$ binary digits received at said first terminal to said second terminal to control the magnitude of the step produced by said second variable size step means.

5. Apparatus as set forth in claim 2 wherein said modulator comprises a delta modulator and said demodulator comprises a delta demodulator.

6. Apparatus as set forth in claim 3 wherein said means to sense a parameter of the message signal comprises:

a level sensor to sense the slope of the message signal.

7. A digital system with companding for transmission of message signals comprising:

a central terminal having a plurality of modulator-demodulator pairs for the conversion of message waveforms and digital signals, one to the other, a plurality of remote terminals, each remote terminal having a plurality of modulator-demodulator pairs, the total number of remote modulator-demodulator pairs being greater than the number of central terminal modulator-demodulator pairs, a plurality of transmission channels, each being coupled to a different one of said plurality of central terminal modulator-demodulator pairs, and each coupled selectively to a different remote terminal modulator-demodulator pair, first means in each modulator of said central terminal modulator-demodulator pairs for producing variable size quantizing step pulses for use in producing a digital message signal from a message waveform, means in each modulator of said central modulator-demodulator pairs for controlling the magnitude of the quantizing step size in response to a parameter of the message waveform, second means in each modulator of the remote terminal modulator-demodulator pairs for producing variable size quantizing step pulses for use in producing a digital message signal from a message waveform, and a plurality of means each associated with a central terminal modulator-demodulator pair for producing control signals for transmission to the remote terminals for controlling the step sizes produced by said plurality of second means.

8. A transmission system as set forth in claim 7 further comprising:

third means in each demodulator in said central modulator-demodulator pairs to provide a variable size step for each demodulator in said central modulator-demodulator pairs where the magnitudes of the steps produced by said third means are controlled by said plurality of means located at said central modulator-demodulator pairs which control the magnitudes of the steps produced by said second means.

9. A transmission system as set forth in claim 8 wherein each one of said plurality of means at said central modulator-demodulator pairs which controls the magnitudes of the steps produced by said second means further comprises:

means to sense a parameter of the message signal transmitted from a modulator of said remote modulator-demodulator pairs to a demodulator of said central modulator-demodulator pairs, an $n$ digit pulse code modulation encoder connected to encode the sensed parameter in terms of $n$ binary digits.

and means to transmit said $n$ binary digits to said modulator of said remote modulator-demodulator pairs to control the magnitude of the step produced at said remote modulator.

10. A transmission system as set forth in claim 9 further including:

means to transmit said $n$ binary digits received at said remote modulator to a demodulator of said central modulator-demodulator pairs to control the magnitude of the step produced at said central demodulators.

11. A digital transmission system as set forth in claim 8 wherein said central and remote modulator-demodulator pairs comprise delta modulator and delta demodulator pairs.

12. Apparatus as set forth in claim 9 wherein said means to sense a parameter of the message signal comprises a level sensor.

13. A delta modulation system with syllabic companding for transmission of a message waveform from a transmitting terminal to a receiving terminal which includes at said transmitting terminal a delta modulator comprising:

a comparator having a single output and a pair of inputs, means to sample the output of said comparator on a periodic repetitive basis, an output transmitter and a first step generator both connected to respond to the sampled output of said comparator, said output transmitter producing a binary digit of one kind for transmission to said receiving terminal whenever the sample is positive and a binary digit of another kind for transmission to said receiving terminal whenever the sample is negative and said first step generator producing a step signal of one polarity whenever the sample is positive and a step signal of the opposite polarity whenever the sample is negative, a first integrator connected to receive the step signal produced by said first step signal generator, means to supply said message waveform and the output from said first integrator to the respective inputs of said comparator, means for controlling the magnitude of the step signal produced by said first step signal generator and, at said receiving terminal, a delta demodulator comprising:

a second step signal generator connected to respond to binary digits received from said output transmitter, said second step signal generator producing a step signal of one polarity whenever the received binary digit is of one kind and a step signal of the opposite polarity whenever the received binary digit is of the other kind, a second integrator connected to receive the step signal produced by said second step signal generator, a low-pass filter connected to the output of said second integrator to recreate the message waveform encoded at said transmitting terminal, means to vary the magnitude of the step signal produced by said second step signal generator in synchronism with the variation of the step signal produced by said first step signal generator at said transmitting terminal, means at said receiving terminal responsive to both the frequency content and volume level of said recreated message waveform for generating step size control signals, and means for applying said control signals to the respective means for controlling the magnitudes of the step signals from said first and second step signal generators.

14. A delta modulation system in accordance with claim 13 wherein said receiving terminal further comprises:

means to form a binary digit representation of the frequency content and volume level of said recreated message waveform, means to transmit said binary digit representation to said transmitting terminal to control the magnitude of the step size produced by said means at said transmitting terminal to vary the magnitude of the step signal, and means to transmit said binary digit representation received at said transmitting terminal to said receiving terminal by said means to vary the magnitude of the step signal at the receiving terminal.

15. Apparatus as set forth in claim 14 wherein said means at said receiving terminal which controls the variable size steps at both the transmitting and receiving terminals comprise:

means to sense the maximum slope of said recreated message waveform, an $n$ digit pulse code modulation encoder connected to encode the detected maximum slope in terms of $n$ binary digits, means to transmit the output of said encoder to said transmitting terminal to control the magnitude of the step size produced at said transmitting terminal, and means to transmit the output of said encoder received at said transmitting terminal to said receiving terminal to control the magnitude of the step size produced at said receiving terminal.

16. Apparatus as set forth in claim 15 wherein said means to produce a variable size step at both the transmitting and receiving terminals comprises means to produce a plurality of discrete step sizes.

References Cited

UNITED STATES PATENTS

| | | | |
|---|---|---|---|
| 2,678,998 | 5/1954 | Young, Jr. | 325—62 |
| 2,912,506 | 11/1959 | Hughes | 179—15[ACE] |
| 3,456,191 | 7/1969 | Rodenberg et al. | 325—62 |
| 3,461,244 | 8/1969 | Brolin | 325—38[.1] |

RICHARD MURRAY, Primary Examiner

J. A. BRODSKY, Assistant Examiner

U.S. Cl. X.R.

179—15; 325—62; 333—14; 340—146.1